United States Patent [19]

Di Bella

[11] 4,038,071

[45] July 26, 1977

[54] PROCESS FOR THE REMOVAL OF MERCURY FROM AQUEOUS SOLUTIONS

[75] Inventor: Eugene P. Di Bella, Piscataway, N.J.

[73] Assignee: Tenneco Chemicals, Inc., Saddle Brook, N.J.

[21] Appl. No.: 705,239

[22] Filed: July 14, 1976

[51] Int. Cl.$^2$ .............................................. C22B 43/00
[52] U.S. Cl. ..................................... 75/108; 75/.5 A; 75/121; 75/117
[58] Field of Search ........................ 75/108, 121, .5 A

[56] References Cited

U.S. PATENT DOCUMENTS

| | | | |
|---|---|---|---|
| 3,390,981 | 7/1968 | Hoffman | 75/108 |
| 3,411,953 | 11/1968 | Larson et al. | 75/108 X |
| 3,458,308 | 7/1969 | Muller | 75/108 |
| 3,494,760 | 2/1970 | Ginder | 75/.5 A |
| 3,501,287 | 3/1970 | Lever | 75/.5 A |
| 3,595,614 | 7/1971 | Ford et al. | 75/108 X |
| 3,679,398 | 7/1972 | Geus | 75/108 |
| 3,718,457 | 2/1973 | Entwisle et al. | 75/121 X |
| 3,732,094 | 5/1973 | Brown et al. | 75/101 R |
| 3,873,581 | 3/1975 | Fitzpatrick et al. | 75/121 X |
| 3,881,914 | 5/1975 | Heidelberg | 75/.5 A |

*Primary Examiner*—G. Ozaki
*Attorney, Agent, or Firm*—Evelyn Berlow

[57] ABSTRACT

A process for the removal of mercury from aqueous solutions that have dissolved therein mercuric salts, organomercury compounds, or mixtures thereof comprises (a) contacting the solutions with an amount of hypophosphorus acid, phosphorous acid, or a water-soluble salt of hypophosphorus acid or phosphorous acid that is sufficient to reduce the mercuric and organomercuric ions in the solution to mercury and (b) separating the precipitated mercury from the solution.

12 Claims, No Drawings

PROCESS FOR THE REMOVAL OF MERCURY FROM AQUEOUS SOLUTIONS

This invention relates to a process for the removal of mercury from aqueous solutions. More particularly, it relates to a process for the removal of mercury from waste streams in which it is present as mercuric ions, organomercuric ions, or mixtures thereof.

There is considerable and growing concern over contamination of waterways with mercury and other heavy metals. These metals, which are known to be toxic to plant and animal life, enter the waterways as effluents from industrial facilities in which mercury compounds are produced or used.

Known processes for the removal of mercury from aqueous solutions include treatment with sodium sulfide or with sodium borohydride, passage through a tower packed with steel turnings, percolation through a bed of activated carbon, and treatment with ion exchange resins. All of these processes suffer from disadvantages that limit their use. Thus, treatment with sodium sulfide to precipitate mercuric sulfide is effective with mercuric ion over a wide pH range, but it introduces the problem of hydrogen sulfide evolution in subsequent sewering operations. In addition, the mercuric sulfide that is obtained must itself be disposed of safely in an approved landfill area or converted to mercury via a roasting operation which is difficult and expensive to carry out. Sulfide treatment is not sufficiently effective with organic mercury compounds except under strongly acidic conditions and/or elevated temperatures where the evolved hydrogen sulfide constitutes a serious health hazard. Also, in many instances mercuric sulfide is formed in the colloidal state, and it is quite difficult to separate from the solution by procedures suitable for commercial operation.

Sodium borohydride is useful as a reagent for reducing mercuric ions to elemental mercury only in neutral or alkaline solutions, and it is not effective in the treatment of effluents that contain organomercuric ions. In addition, the high cost of sodium borohydride militates against its routine commercial use.

The process for the removal of mercury from effluents by percolation through a bed packed with steel turnings is slow, and it requires a large volume of turnings. The steel gradually becomes inactive as a result of amalgamation. Moreover, the mercury separates as a slime that requires distillation or other processing before the mercury can be recovered in usable form. The use of activated carbon is usually unsatisfactory for effluents containing relatively high levels (> 1000 ppm) of mercury because the capacity of the carbon for mercury is small and the mercury is adsorbed irreversibly. Ion exchange and chelation resins are suitable for the removal of inorganic compounds from aqueous solutions only when the solutions are free of suspended solids. Mercury is recovered either by destroying the resins by retorting or by using multistep leaching procedures, which are time-consuming and costly.

In accordance with this invention, it has been found that aqueous solutions that are contaminated with mercury can be purified by treating them with sufficient hypophosphorous acid or phosphorous acid to reduce the mercuric ions and organomercuric ions that they contain to elemental mercury and separating the mercury from the solution. The process provides a practical means of effecting the removal of mercury in both organic and inorganic form from effluent liquors encountered in industrial operations. No hazardous by-products result from this treatment, and the precipitated mercury can be recovered substantially quantitatively for subsequent reuse.

In the practice of the process of this invention, hypophosphorous acid, phosphorous acid, or a water-soluble salt of hypophosphorous acid or phosphorous acid, such as sodium hypophosphite, potassium hypophosphite, calcium hypophosphite, sodium phosphite, or diethyl hydrogen phosphite, is added to an aqueous solution that contains mercuric ions and/or organomercuric ions in an amount sufficient to reduce the ions to mercury. When the reduction has been completed, the precipitated mercury is separated from the solution by filtration, decantation, or other conventional technique.

The solutions that can be purified by the process of this invention are aqueous solutions that contain from 100 ppm to 20,000 ppm of mercury as a mercury salt or an organomercury compound. Illustrative of the salts that may be present are mercuric chloride, mercuric sulfate, mercuric acetate, and mercuric nitrate. Organomercury compounds that may be present include phenylmercuric acetate, phenylmercuric chloride, phenylmercuric bromide, phenylmercuric oleate, phenylmercuric benzoate, bis(phenylmercuric) dodecenylsuccinate, methylmercuric chloride, methylmercuric bromide, ethylmercuric acetate, and ethylmercuric bromide. The solutions may contain onr or more mercury compounds.

The reaction by which mercuric ion is reduced by hypophosphorous acid is shown in the following equation:

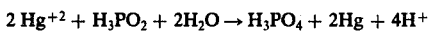

$$2\,Hg^{+2} + H_3PO_2 + 2H_2O \rightarrow H_3PO_4 + 2Hg + 4H^+$$

From this equation, it will be seen that one mole of hypophosphorous acid is required to reduce two moles of mercuric ion. In the practice of this process, larger amounts are ordinarily used to compensate for the presence of other oxidant contaminants in the solution and for any decomposition of the hypophosphorous acid that may occur at elevated temperatures. Best results have been obtained when from 2 moles to 3 moles of hypophosphorous acid or a water-soluble salt of this acid is used per mole of mercury in the solution.

It should be noted that the use of hypophosphorous acid as a reducing agent in this reaction must be accompanied by the transitory formation of phosphorous acid, $H_3PO_3$. Although phosphorous acid is a less efficient reducing species with respect to reaction with organomercury compounds, this intermediate should also be considered as contributing to the overall operation of this process.

When the aqueous solution contains mercury in the form of mercuric ions, the hypophosphite reduction can be effected under either neutral or acidic conditions, that is at a pH of 7 or lower. For the reduction of organomercuric ions to take place, an acidity level corresponding to the presence of free hypophosphorous acid, that is a pH of 2 or lower, is necessary. When both mercuric ions and organomercuric ions are present, the reduction reaction may be effected at acidity levels as high as pH 5 provided that a high mole ratio of hypophosphite to mercury is used; it is preferably out at a pH of 2 or lower.

The aqueous solution is usually maintained at a temperature between 40° C. and 100° C. during the reduction reaction. When reaction times of 1 hour or less are desired, the reduction is carried out at temperatures between 70° C. and 100° C. Temperatures as low as 20° C. can be employed when only mercuric ions are present, but at such low temperatures prolonged reaction periods may be necessary to achieve complete reduction of the mercuric ions.

In a preferred embodiment of this invention, an aqueous solution that contains from 100 ppm to 20,000 ppm of mercury is acidified with a mineral acid, such as sulfuric acid, hydrochloric acid, or phosphoric acid, to a pH of 2 or lower. Sodium hypophosphite is added to the acidified solution, and the resulting mixture is maintained at 70° to 100° C. until reduction of the mercuric ions and/or organomercuric ions has been completed. The resulting solution, which contains precipitated mercury, is cooled and neutralized. After the separation of mercury from it by decantation, filtration, or other technique, the solution usually contains less than 5 ppm of mercury. It may be contacted with an adsorbent, such as activated carbon, activated clay, diatomaceous earth, titania, silica, or alumina, to reduce its mercury content to less than 10 ppb. The resulting purified solution can be fed into waterways or employed in other water usages without creating health hazards.

The process of this invention is of particular value in the removal of mercuric ions and organomercuric ions from aqueous solutions. It can also be used to remove from aqueous solutions ions of other heavy metals which have low electromotive force, such as copper and tin.

This invention is further illustrated by the following examples.

EXAMPLE 1

An aqueous effluent resulting from the manufacture of phenylmercuric acetate was found by analysis to contain 1170 ppm of mercury, which consisted of mercuric ions and phenylmercuric ions in the ratio of 81 to 19.

To a 375 gram portion of this effluent, which contained 0.44 gram (0.002 mole) of mercury, was added sufficient 98% sulfuric acid to bring its pH to 1.3. Then 0.50 gram (0.0047 mole) of sodium hypophosphite monohydrate was added to the acidified solution, and the resulting mixture was heated with stirring at 80° - 85° C.

After heating periods of 1, 2, and 3 hours, samples of a hazy, light gray reaction product were filtered through a one micron pad and then analyzed for residual soluble mercury compounds by the flameless atomic absorption procedure described in ASTM Method D 3223-73. The results obtained are set forth in the following Table.

EXAMPLE 2

The procedure described in Example 1 was repeated except that 1.0 gram (0.0094 mole) of sodium hypophosphite monohydrate was added to the acidified solution. The amounts of soluble mercury compounds remaining in the solution after 1, 2, and 3 hours at 80° - 85° C. are given in the Table.

EXAMPLE 3

The procedure described in Example 1 was repeated except that 1.5 gram (0.0142 mole) of sodium hypophosphite monohydrate was added to the acidified solution. The amounts of soluble mercury compounds remaining in the solution after 1, 2, and 3 hours at 80° - 85° C. are given in the Table.

Table

| Ex. No. | Mole Ratio $H_3PO_2$/Hg | Time (Hours) | Residual Hg (ppm) |
|---|---|---|---|
| 1 | 2.14/1 | 1 | 0.23 |
|   |        | 2 | 0.26 |
|   |        | 3 | 0.36 |
| 2 | 4.28/1 | 1 | 0.33 |
|   |        | 2 | 0.33 |
|   |        | 3 | 0.45 |
| 3 | 6.42/1 | 1 | 0.85 |
|   |        | 2 | 0.59 |
|   |        | 3 | 0.77 |

From these data it will be seen that the lowest use level of hypophosphorous acid for one hour was sufficient to reduce the total mercury level of the aqueous effluent to less than 1 ppm. There appears to be no advantage in the use of additional hypophosphorous acid and/or longer heating periods.

EXAMPLE 4

The procedure described in Example 1 was repeated except that 1.2 grams (0.0087 mole) of diethyl hydrogen phosphite, as a souce of phosphorous acid, was added to the acidified solution instead of sodium hypophosphite monohydrate. After heating for 1 hour at 80° - 85° C., the treated reaction mixture contained 2.0 ppm of mercury.

EXAMPLE 5

A dispersion was prepared by mixing together 11.2 grams of a commercial paint additive formulation (Super Ad-it), which comprises bis(phenylmercuric)-dodecenylsuccinate and mineral spirits and contains 10% by weight of mercury, 1100 grams of water, and 1.0 gram of a sulfonate oxide surfactant (Agrimul A-300). To the dispersion, which contained about 1000 ppm of mercury, was added 1.5 grams of 98% sulfuric acid and 1.5 grams (0.0142 mole) of sodium hypophosphite monohydrate. The resulting mixture was heated with stirring at 97° C. for 30 minutes during which time a dark cloudiness (metallic mercury) developed in it. A sample of the mixture was diluted with five times its weight of acetone to dissolve organic material and then filtered through Whatman No. 5 paper. The treated reaction mixture (corrected for the acetone dilution) was shown by analysis to contain 1.8 ppm of mercury.

COMPARATIVE EXAMPLE

The procedure described in Example 5 was repeated except that no sulfuric acid was added to the dispersion. The dispersion, which was at pH 6 when the sodium hypophosphite monohydrate was added to it, did not undergo reduction of its contained mercury compounds to metallic mercury or any other apparent change during the heating period at 97° C. The mercury content of the treated reaction mixture was about 1000 ppm.

EXAMPLE 6

The procedure described in Example 5 was repeated except that 1.2 grams (0.0087 mole) of diethyl hydrogen phosphite, as a source of phosphorous acid, was added to the acidified dispersion instead of sodium hypophosphite monohydrate. After heating with stirring at 97° C. for 1 hour, the treated reaction mixture contained 48 ppm of mercury.

EXAMPLE 7

The procedure described in Example 5 was repeated except that 1.4 grams (0.0091 mole) of phosphorus trichloride, as a source of phosphorous acid, was added to the acidified dispersion instead of sodium hypophosphite monohydrate. After heating with stirring at 97° C. for 1 hour, the treated reaction mixture contained 30 ppm of mercury.

EXAMPLE 8

In a commercial process for the production of mercuric oxide, metallic mercury is chlorinated in water to form an aqueous solution of mercuric chloride, and the mercuric chloride solution is treated with alkali to form water-insoluble mercuric oxide. The liquor remaining after the separation of mercuric oxide contains mercuric ions and a significant amount of sodium hypochlorite.

To 925 pounds of an alkaline aqueous decantate liquor resulting from this mercuric oxide manufacturing process and containing about 1500 ppm of mercury was added sufficient 98% sulfuric acid to reduce its pH to 0.6. This step resulted in the liberation of free hypochlorous acid and chlorine.

After 80 pounds of sodium hypophosphite monohydrate had been added to the acidified liquor, the mixture was stirred and heated to 90° – 95° C. in 30 minutes and then cooled to 40° – 50° C. Sufficient 30% sodium hydroxide solution was added to bring the pH of the reaction mixture to 6.8. When the agitation of the reaction mixture was discontinued, 14 pounds of metallic mercury settled to the bottom of the reaction vessel. This mercury was withdrawn from the vessel and used in a subsequent mercuric oxide manufacturing operation.

The resulting treated aqueous liquor, which weighed 1570 pounds, contained 2.3 ppm of mercury which, according to the combined data obtained by analysis using the flameless atomic absorption and dithizone titration procedures, consisted of 0.4 ppm of mercuric ion and 1.9 ppm of elemental mercury.

The treated liquor, which contained only 0.3% of the mercury present in the untreated liquor, was passed through a column containing activated carbon to reduce its total mercury content to less than 10 parts per billion.

What is claimed is:

1. The process for the removal of mercury from an aqueous solution containing mercury in the form of mercuric ions, organo-mercuric ions, or mixtures thereof that comprises the steps of
   a. contacting the solution with a reducing agent selected from the group consisting of hypophosphorous acid, phosphorous acid, and the water-soluble salts of hypophosphorous acid and phosphorous acid in an amount sufficient to reduce the ions in the solution to mercury and
   b. separating mercury from the aqueous solution.
2. The process of claim 1 wherein in Step (a) the solution is maintained at a temperature in the range of 40° C. to 100° C.
3. The process of claim 1 wherein in Step (a) the solution is maintained at a temperature in the range of 70° C to 100° C.
4. The process of claim 1 wherein in Step (a) at least one mole of the reducing agent is present per 2 moles of mercury in the solution.
5. The process of claim 1 wherein in Step (a) from 2 to 3 moles of the reducing agent is present per mole of mercury in the solution.
6. The process of claim 1 wherein in Step (a) an aqueous solution containing mercury as mercuric ions is at a pH of 7 or lower when it is contacted with the reducing agent.
7. The process of claim 1 wherein in Step (a) an aqueous solution containing mercury as organomercuric ions is at a pH of 2 or lower when it is contacted with the reducing agent.
8. The process of claim 1 wherein the reducing agent used in Step (a) is sodium hypophosphite.
9. The process of claim 1 wherein the reducing agent used in Step (a) is hypophosphorous acid.
10. The process of claim 1 that comprises the steps of
    a. adjusting the acidity of the aqueous solution to a pH of 2 or lower,
    b. contacting the acidified solution with from 2 to 3 moles of sodium hypophosphite per mole of mercury in the solution,
    c. maintaining said solution at a temperature in the range of 70° C. to 100° C. until the mercuric ions and organomercuric ions in the solution have been reduced to mercury,
    d. separating mercury from the treated aqeuous solution, and
    e. recovering an aqueous solution that contains less than 5 ppm of mercury.
11. The process of claim 10 wherein the aqeuous solution that is recovered in Step (e) is contacted with an adsorbent selected from the group consisting of activated carbon, activated clay, diatomaceous earth, titania, silica, and alumina, and a solution containing less than 10 ppb of mercury is recovered.
12. The process of claim 1 wherein the adsorbent is activated carbon.

* * * * *